United States Patent
Nitta et al.

(10) Patent No.: US 10,297,841 B2
(45) Date of Patent: May 21, 2019

(54) FUEL CELL AND PRODUCTION APPARATUS FOR THE FUEL CELL

(71) Applicant: HONDA MOTOR CO., LTD., Minato-Ku, Tokyo (JP)

(72) Inventors: Yoshiyuki Nitta, Wako (JP); Yasuhide Fukushima, Wako (JP); Masaaki Sakano, Wako (JP); Shintaro Sumi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 238 days.

(21) Appl. No.: 15/083,667

(22) Filed: Mar. 29, 2016

(65) Prior Publication Data

US 2016/0293977 A1 Oct. 6, 2016

(30) Foreign Application Priority Data

Mar. 31, 2015 (JP) .................................. 2015-072943
Mar. 18, 2016 (JP) .................................. 2016-054800

(51) Int. Cl.
| | | |
|---|---|---|
| H01M 8/0273 | (2016.01) | |
| H01M 8/0297 | (2016.01) | |
| H01M 8/1004 | (2016.01) | |
| H01M 8/0206 | (2016.01) | |
| B23K 11/00 | (2006.01) | |
| B23K 11/36 | (2006.01) | |
| H01M 8/0267 | (2016.01) | |
| H01M 8/1018 | (2016.01) | |

(52) U.S. Cl.
CPC ....... *H01M 8/0297* (2013.01); *B23K 11/0026* (2013.01); *B23K 11/36* (2013.01); *B23K 11/362* (2013.01); *H01M 8/0206* (2013.01); *H01M 8/0267* (2013.01); *H01M 8/0273* (2013.01); *H01M 8/1004* (2013.01); *H01M 2008/1095* (2013.01); *Y02P 70/56* (2015.11)

(58) Field of Classification Search
CPC ............. H01M 8/0297; H01M 8/0267; H01M 8/1004; H01M 8/0206; H01M 8/0273; H01M 2008/1095; B23K 11/36; B23K 11/362; B23K 11/0026; Y02P 70/56
See application file for complete search history.

(56) References Cited

U.S. PATENT DOCUMENTS

| | | | | |
|---|---|---|---|---|
| 2006/0263667 A1* | 11/2006 | Toro | ............... | H01M 8/0228 429/434 |
| 2008/0134496 A1* | 6/2008 | Bae | ............... | H01M 8/0206 29/623.2 |
| 2014/0227622 A1* | 8/2014 | Nishiyama | ............. | H01M 8/242 429/463 |

FOREIGN PATENT DOCUMENTS

JP 2012-089505 A 5/2012

\* cited by examiner

*Primary Examiner* — Philip A. Stuckey
(74) *Attorney, Agent, or Firm* — Carrier Blackman & Associates, P.C.; William D. Blackman; Joseph P. Carrier (57) ABSTRACT

A fuel cell includes a frame equipped membrane electrode assembly and a metal separator. The frame equipped membrane electrode assembly includes a membrane electrode assembly and a frame shaped insulating member connected to the membrane electrode assembly. The frame shaped insulating member is provided around the membrane electrode assembly. The metal separator includes a first bipolar plate and a second bipolar plate joined together, and the frame shaped insulating member includes a welding portion welded to the first bipolar plate by resistance welding.

5 Claims, 11 Drawing Sheets

FUEL CELL AND PRODUCTION APPARATUS FOR THE FUEL CELL

CROSS-REFERENCE TO RELATED APPLICATIONS

This application is based upon and claims the benefit of priority from Japanese Patent Applications No. 2015-072943 filed on Mar. 31, 2015 and No. 2016-054800 filed on Mar. 18, 2016, the contents all of which are incorporated herein by reference.

BACKGROUND OF THE INVENTION

Field of the Invention

The present invention relates to a fuel cell including a frame equipped membrane electrode assembly and a metal separator. The frame equipped membrane electrode assembly includes a membrane electrode assembly, in which electrodes are disposed on both sides of an electrolyte membrane, and a frame shaped insulating member connected to the membrane electrode assembly. The frame shaped insulating member is provided around the membrane electrode assembly. Further, the present invention relates a production apparatus for the fuel cell.

Description of the Related Art

In general, a solid polymer fuel cell employs a solid polymer electrolyte membrane. The solid polymer electrolyte membrane is a polymer ion exchange membrane. In this fuel cell, the solid polymer electrolyte membrane is interposed between an anode and a cathode to form a membrane electrode assembly (MEA). The membrane electrode assembly is sandwiched between separators (bipolar plates) to form a fuel cell. In use, generally, a predetermined number of the fuel cells are stacked together to form a fuel cell stack. For example, the fuel cell stack is mounted in a vehicle as an in-vehicle fuel cell stack.

Normally, the fuel cell stack is formed by stacking a large number (several tens to several hundreds) of fuel cells. For this purpose, for example, Japanese Laid-Open Patent Publication No. 2012-089505 discloses a fuel cell and a method of producing the fuel cell. According to the disclosure, it is possible to assemble a plurality of fuel cells easily and quickly, and perform the assembling operation of the fuel cells efficiently.

In this fuel cell, each of cell units is formed by stacking a membrane electrode assembly and a separator together. The cell units are joined together integrally using joint pins. Each of the joint pins has a large diameter flange which is engaged with the cell units at one end. Further, the joint pin includes a head portion engaged with the cell units at the other end. The large diameter flange has a recess for suction/holding of the joint pin. Further, according to the disclosure, the recess is sucked to fixedly position the joint pin. In this state, the cell units can be provided integrally with respect to each joint pin.

SUMMARY OF THE INVENTION

The present invention has been made in relation to the technique of this type, and an object of the present invention is to provide a fuel cell and a production apparatus for the fuel cell in which it is possible to perform assembling operation of the fuel cell efficiently and suitably at low cost.

A fuel cell according to the present invention includes a frame equipped membrane electrode assembly and a metal separator. The frame equipped membrane electrode assembly includes a membrane electrode assembly and a frame shaped insulating member connected to the membrane electrode assembly. The membrane electrode assembly includes an electrolyte membrane and electrodes on both sides of the electrolyte membrane. The frame shaped insulating member is provided around the membrane electrode assembly.

Further, the metal separator includes a first bipolar plate and a second bipolar plate joined together, and the frame shaped insulating member includes a welding portion welded to the first bipolar plate by resistance welding.

Further, preferably, the first bipolar plate includes a protrusion which contacts the welding portion of the frame shaped insulating member. Further, preferably, the second bipolar plate includes a hole at a position in alignment with the protrusion as viewed in a direction in which the first bipolar plate and the second bipolar plate are stacked together.

Further, preferably, the metal separator includes a reactant gas seal line configured to prevent leakage of a reactant gas, and a coolant seal line configured to prevent leakage of a coolant, and the protrusion and the hole are provided outside the reactant gas seal line and the coolant seal line.

Further, a fuel cell production apparatus according to the present invention includes a pedestal section and a resistance welding electrode member. The frame equipped membrane electrode assembly is placed on the pedestal section, and the metal separator is placed on the frame equipped membrane electrode assembly. The resistance welding electrode member contacts the protrusion stacked on the welding portion. The pedestal section includes an insulating pedestal on which at least the membrane electrode assembly is placed, and a metal pedestal on which the welding portion is placed.

Further, in the fuel cell production apparatus, preferably, the metal pedestal includes a positioning pin, and positioning holes are formed in the frame shaped insulating member and the metal separator, respectively, and configured to insert the positioning pin into the positioning holes.

Further, in the fuel cell production apparatus, preferably, a jig is provided on a side opposite to the pedestal section. The frame equipped membrane electrode assembly and the metal separator are interposed between the pedestal section and the jig. In this case, preferably, one of terminals of a power supply is connected to the resistance welding electrode member, and another of the terminals of the power supply is connected to the jig.

Further, in the fuel cell production apparatus, preferably, the resistance welding electrode member includes a first resistance welding electrode member which contacts a first protrusion and a second resistance welding electrode member which contacts a second protrusion which is different from the first protrusion. In this case, preferably, one of the terminals of the power supply is connected to the first resistance welding electrode member, and the other of the terminals of the power supply is connected to the second resistance welding electrode member.

Further, in the fuel cell production apparatus, preferably, the resistance welding electrode member includes a first resistance welding electrode member and a second resistance welding electrode member, and in a state where the first and second resistance welding electrode members are insulated from each other, the first and second resistance welding electrode members contact the same protrusion at the same time. In this case, preferably, one of the terminals of the power supply is connected to the first resistance welding electrode member, and the other of the terminals of the power supply is connected to the second resistance welding electrode member.

In the present invention, the welding portion is provided in the frame shaped insulating member connected to the outer portion of the membrane electrode assembly. The welding portion is welded to the first bipolar plate by resistance welding. In the structure, the cooling process as in the case of welding (joining) by high frequency heating becomes unnecessary, and the time period required for welding is reduced effectively. Moreover, no dedicated member is required for the welding portion, and the structure can be simplified advantageously. Accordingly, it becomes possible to perform the assemble operation of the fuel cells efficiently and suitably at low cost.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
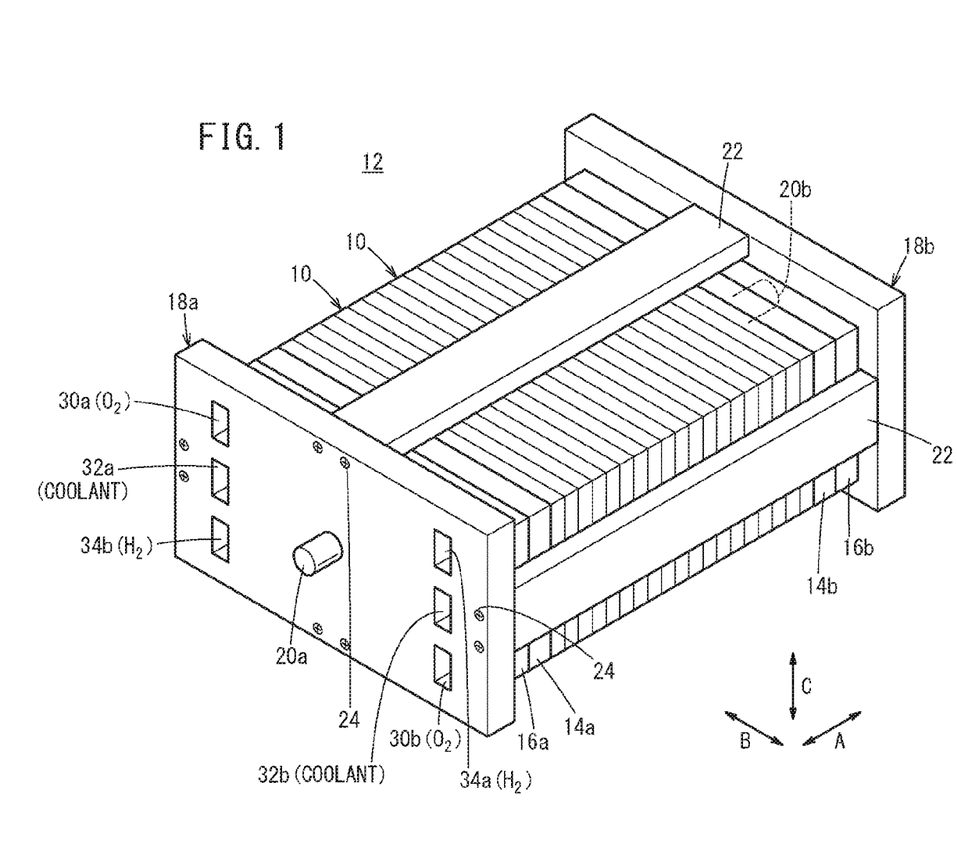
FIG. 1 is a perspective view showing a fuel cell stack including fuel cells according to an embodiment of the present invention.

As shown in FIG. 1, a plurality of fuel cells 10 according to an embodiment of the present invention are stacked together in a horizontal direction indicated by an arrow A or in the gravity direction indicated by an arrow C to form a fuel cell stack 12. For example, the fuel cell stack 12 is an in-vehicle fuel cell stack. The fuel cell stack 12 is mounted in a fuel cell electric vehicle (not shown), etc.

In the fuel cell stack 12, at one end of the fuel cells 10 in a stacking direction, a terminal plate 14a is provided. An insulator 16a is provided outside the terminal plate 14a, and an end plate 18a is provided outside the insulator 16a. At the other end of the fuel cells 10 in the stacking direction, a terminal plate 14b is provided. An insulator 16b is provided outside the terminal plate 14b, and an end plate 18b is provided outside the insulator 16b. Terminals 20a, 20b are provided at substantially the central positions of the terminal plates 14a, 14b. The terminals 20a, 20b extend toward the outside in the stacking direction. The terminals 20a, 20b protrude outward from the end plates 18a, 18b.

The end plates 18a, 18b have a laterally or horizontally (or vertically) elongated rectangular shape. Coupling bars 22 are provided at intermediate positions of respective sides of the end plates 18a, 18b, Both ends of each coupling bar 22 are fixed to inner surfaces of the end plates 18a, 18b using bolts 24 for applying a tightening load to the plurality of stacked fuel cells 10 in the stacking direction indicated by the arrow A. The fuel cell stack 12 may include a casing including the end plates 18a, 18b, and the plurality of fuel cells 10 may be placed in the casing.

Figure 2:
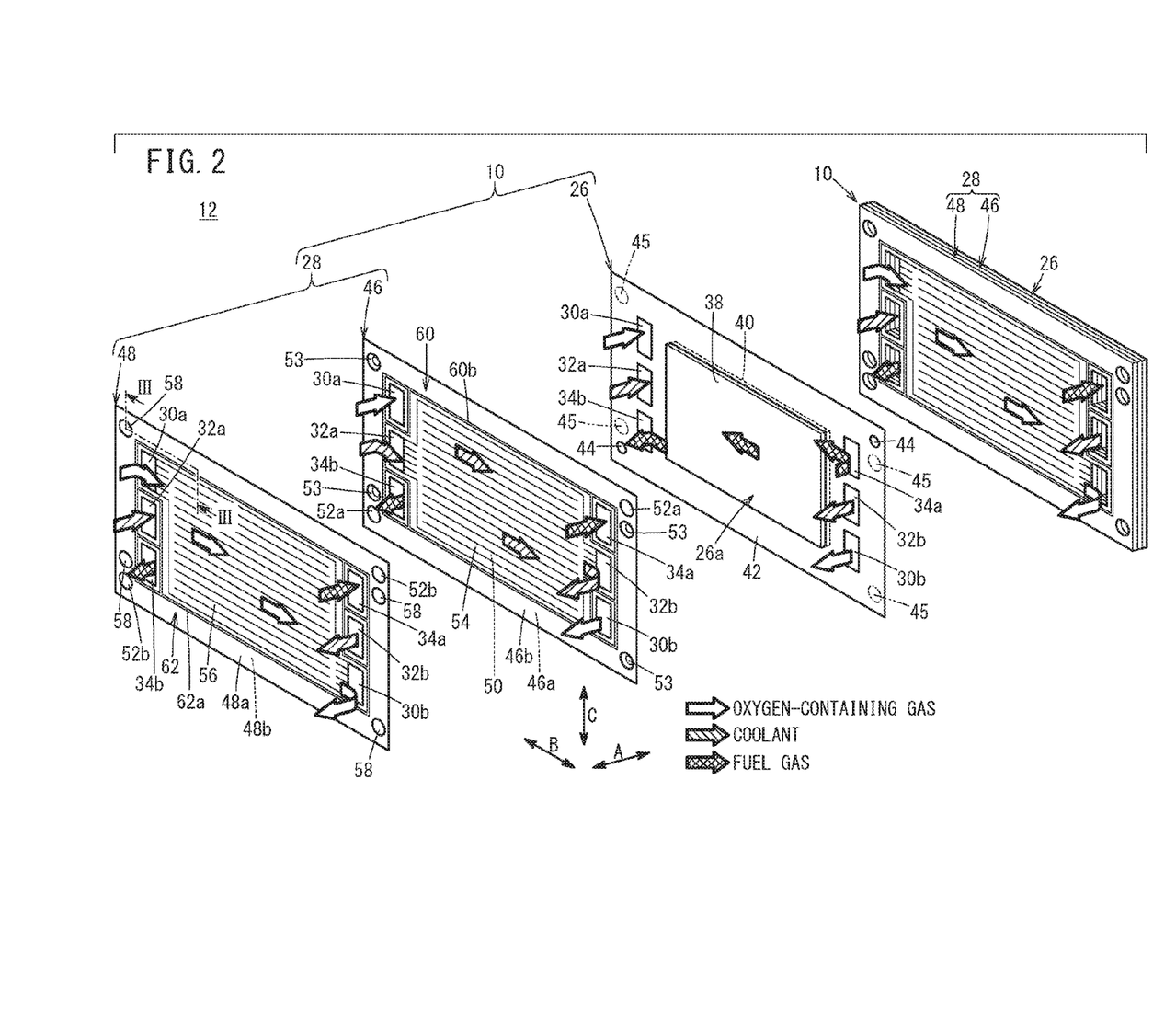
FIG. 2 is a perspective view showing a state where the fuel cell is partially taken into apart.

As shown in FIG. 2, each of the fuel cells 10 includes a frame equipped membrane electrode assembly (frame equipped MEA) 26 and metal separators 28. The frame equipped membrane electrode assemblies 26 and metal separators 28 are stacked alternately to form the fuel cell stack 12. At one end of the fuel cells 10 in the horizontal direction indicated by the arrow B, an oxygen-containing gas supply passage 30a, a coolant supply passage 32a, and a fuel gas discharge passage 34b are provided. The oxygen-containing gas supply passage 30a, the coolant supply passage 32a, and the fuel gas discharge passage 34b extend through the fuel cells 10 in the direction indicated by the arrow A.

An oxygen-containing gas is supplied to the fuel cells 10 through the oxygen-containing gas supply passage 30a, a coolant is supplied to the fuel cells 10 through the coolant supply passage 32a, and a fuel gas such as a hydrogen-containing gas is discharged from the fuel cells 10 through the fuel gas discharge passage 34b. The oxygen-containing gas supply passage 30a, the coolant supply passage 32a, and the fuel gas discharge passage 34b are arranged in the vertical direction indicated by the arrow C.

At the other end of the fuel cells 10 in the direction indicated by the arrow B, a fuel gas supply passage 34a, a coolant discharge passage 32b, and an oxygen-containing gas discharge passage 30b are provided. The fuel gas is supplied to the fuel cells 10 through the fuel gas supply passage 34a. The coolant is discharged from the fuel cells 10 through the coolant discharge passage 32b. The oxygen-containing gas is discharged from the fuel cells 10 through the oxygen-containing gas discharge passage 30b. The fuel gas supply passage 34a, the coolant discharge passage 32b, and the oxygen-containing gas discharge passage 30b extend through the fuel cells 10 in the direction indicated by the arrow A, and are arranged in the direction indicated by the arrow C.

Figure 3:
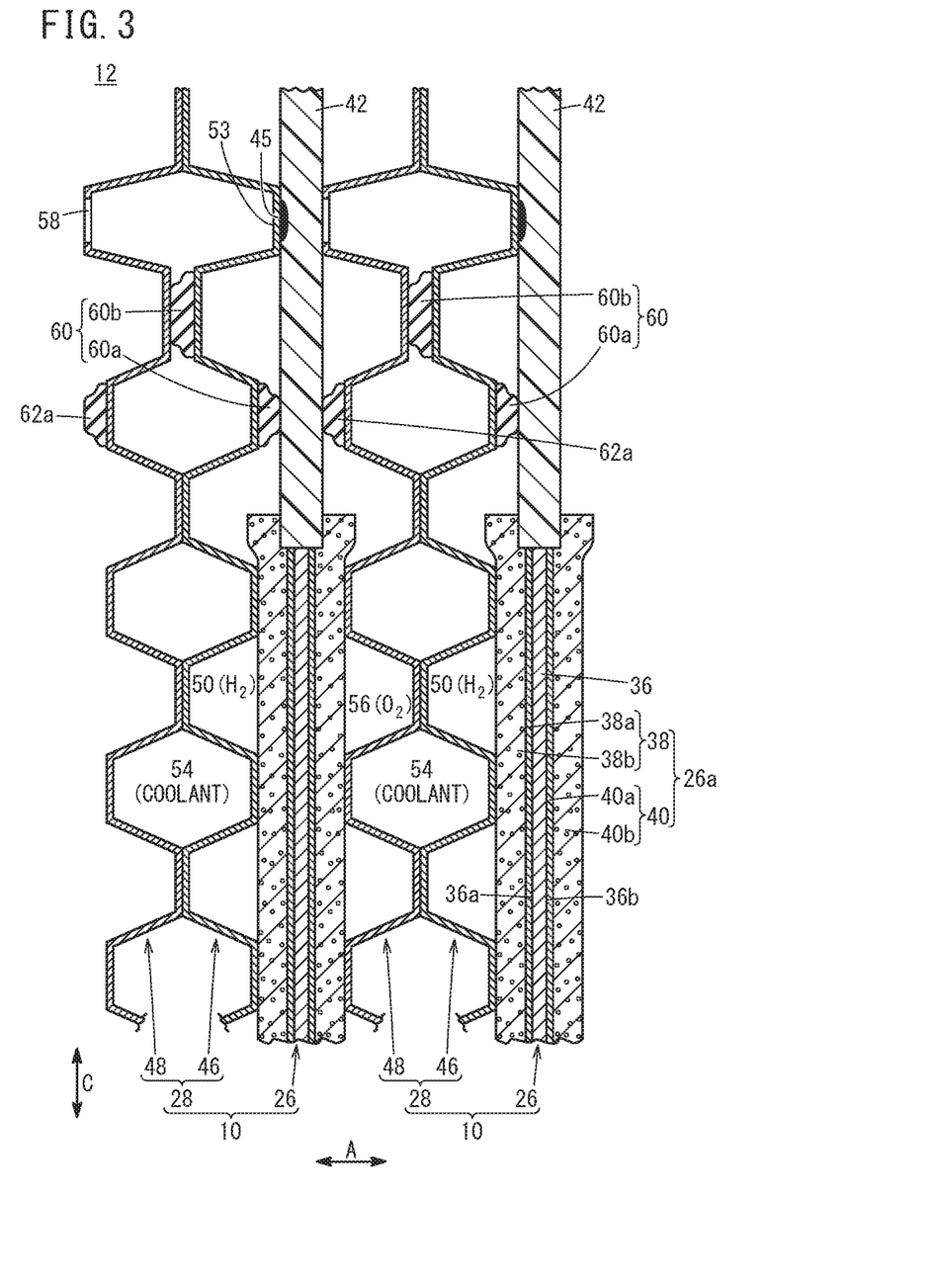
FIG. 3 is a cross sectional view showing the fuel cell stack, taken along a line in FIG. 2.

As shown in FIGS. 2 and 3, the frame equipped membrane electrode assembly 26 includes a membrane electrode assembly (MEA) 26a. The membrane electrode assembly 26a includes a solid polymer electrolyte membrane (cation exchange membrane) 36, and an anode 38 and a cathode 40 sandwiching the solid polymer electrolyte membrane 36. The solid polymer electrolyte membrane 36 is formed by impregnating a thin membrane of perfluorosulfonic acid with water, for example. A fluorine based electrolyte may be used as the solid polymer electrolyte membrane 36. Alternatively, an MC (hydrocarbon) based electrolyte may be used as the solid polymer electrolyte membrane 36.

As shown in FIG. 3, the anode 38 includes a first electrode catalyst layer 38a joined to one surface 36a of the solid polymer electrolyte membrane 36, and a first gas diffusion layer 38b stacked on the first electrode catalyst layer 38a. The outer size of the first gas diffusion layer 38b is larger than the outer sizes of the solid polymer electrolyte membrane 36 and the first electrode catalyst layer 38a. Alternatively, the outer size of the first gas diffusion layer 38b may be the same as the outer sizes of the solid polymer electrolyte membrane 36 and the first electrode catalyst layer 38a.

The cathode 40 includes a second electrode catalyst layer 40a joined to the other surface 36b of the solid polymer electrolyte membrane 36 and a second gas diffusion layer 40b stacked on the second electrode catalyst layer 40a. The outer size of the second gas diffusion layer 40b is larger than the outer sizes of the solid polymer electrolyte membrane 36 and the second electrode catalyst layer 40a. Alternatively, the outer size of the second gas diffusion layer 40b may be the same as the outer sizes of the solid polymer electrolyte membrane 36 and the second electrode catalyst layer 40a. It should be noted that the plane surfaces of the anode 38 and the cathode 40 may have different sizes from each other.

The first electrode catalyst layer 38a is formed by porous carbon particles deposited uniformly on the surface of the first gas diffusion layer 38b with platinum alloy supported on the porous carbon particles. The second electrode catalyst layer 40a is formed by porous carbon particles deposited uniformly on the surface of the second gas diffusion layer 40b with platinum alloy supported on the porous carbon particles. Each of the first gas diffusion layer 38b and the second gas diffusion layer 40b comprises a carbon paper or a carbon cloth, etc. The first electrode catalyst layer 38a and the second electrode catalyst layer 40a are formed on both surfaces 36a, 36b of the solid polymer electrolyte membrane 36, respectively.

A frame shaped insulating member 42 is connected to the membrane electrode assembly 26a to form the frame equipped membrane electrode assembly 26. The frame shaped insulating member 42 is provided around the membrane electrode assembly 26a. An inner edge of the frame shaped insulating member 42 is sandwiched between outer edges of the first gas diffusion layer 38b and the second gas diffusion layer 40b (overlapped portion). It should be noted that the joint structure for joining the frame shaped insulating member 42 to the first gas diffusion layer 38b and the second gas diffusion layer 40b is not limited to this structure. As long as the frame shaped insulating member 42 can be joined to the first gas diffusion layer 38b and the second gas diffusion layer 40b suitably, any joint structure can be adopted. For example, the frame shaped insulating member 42 is made of PPS (polyphenylene sulfide), PPA (polyphthalamide), PEN (polyethylenenaphthalate), PES (polyether sulfone), LCP (liquid crystal polymer), PVDF (polyvinylidene fluoride), HDPE (high density polyethylene), PE (polyethylene), PP (polypropylene), POM (polyoxymethylene), silicone resin, fluororesin, or m-PPE (modified polyphenylene ether resin), etc. Further, the frame shaped insulating member 42 is not limited to PET (polyethylene terephthalate), PET (polybutylene terephthalate), modified polyolefin, or a resin film. Alternatively, the frame shaped insulating member 42 may be made of seal material, cushion material, or packing material such as an EPDM rubber (ethylene propylene diene monomer rubber), an NBR (nitrile butadiene rubber), a fluoro rubber, a silicone rubber, a fluorosilicone rubber, a butyl rubber, a natural rubber, a styrene rubber, a chloroprene rubber, or an acrylic rubber.

As shown in FIG. 2, the outer size of the frame shaped insulating member 42 and the outer size of the metal separator 28 are substantially the same. It should be noted that the outer size of the frame shaped insulating member 42 may be larger than the outer size of the metal separator 28. The oxygen-containing gas supply passage 30a, the coolant supply passage 32a, the fuel gas discharge passage 34b, the fuel gas supply passage 34a, the coolant discharge passage 32b, and the oxygen-containing gas discharge passage 30b extend through the frame shaped insulating member 42. A pair of circular positioning holes 44 for positioning the MEA are formed at one pair of diagonal positions of the frame shaped insulating member 42.

The frame shaped insulating member 42 has welding portions 45 welded to a first bipolar plate 46 described later by resistance welding. The welding portions 45 are provided at four positions, adjacent to the other pair of diagonal positions of the frame shaped insulating member 42 and adjacent to the positioning holes 44. The number and the positions of the welding portions 45 can be changed variously.

The metal separator 28 shown on the far left portion of the drawing in FIG. 3 is a first metal separator disposed on a first side of the frame equipped MEA 26, (the left side as shown in the drawing) and includes both the first bipolar plate 46 and a second bipolar plate 48, portions of the first and second bipolar plates being in abutting contact with one another and joined together. The first bipolar plate 46 and the second bipolar plate 48 are made of metal plates such as steel plates, stainless steel plates, aluminum plates, plated steel sheets, titanium steel plates or metal plates having anti-corrosive surfaces by surface treatment, and have corrugated surfaces in cross section formed by press forming. The fuel cell 12 also includes a second metal separator 28 disposed on a second side of the frame equipped MEA 26, (the right side as shown in the drawing) and this second metal separator has a structure substantially identical to the first metal separator as described herein, including both a third bipolar plate 46 and a fourth bipolar plate 48, with portions of the third and fourth bipolar plates being in abutting contact with one another and joined together.

Figure 4:
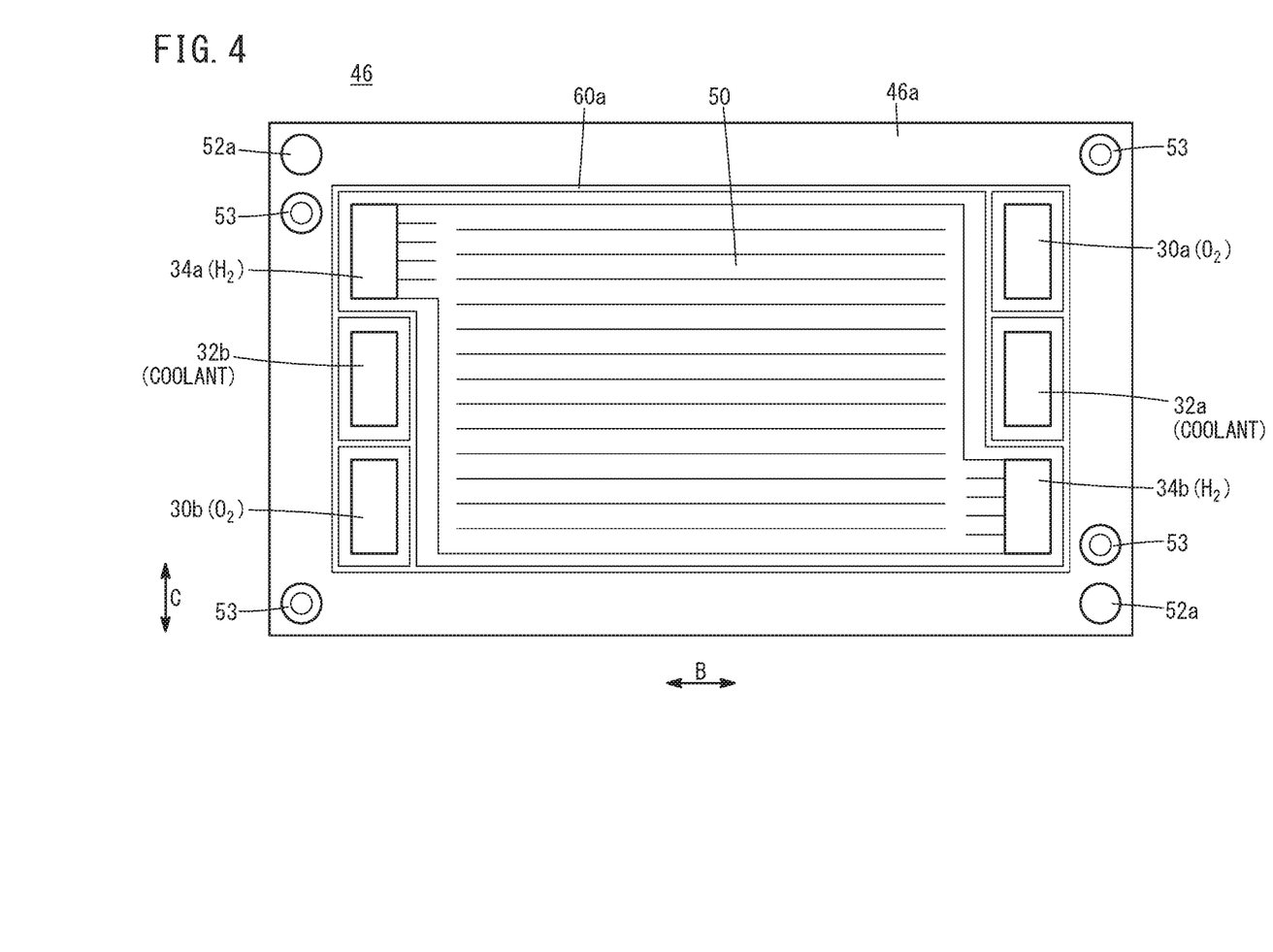
FIG. 4 is a front view showing a first bipolar plate of the fuel cell.

As shown in FIG. 4, the first bipolar plate 46 has a fuel gas flow field 50 on its surface 46a facing the anode 38 of the membrane electrode assembly 26a. The fuel gas flow field 50 is connected to the fuel gas supply passage 34a and the fuel gas discharge passage 34b. The fuel gas flow field 50 includes a plurality of fuel gas flow grooves extending in the direction indicated by the arrow B.

Circular positioning holes 52a are formed at one pair of diagonal positions (adjacent to the fuel gas supply passage 34a and the fuel gas discharge passage 34b) of the first bipolar plate 46. The positioning holes 52a are provided coaxially with the positioning holes 44 of the frame shaped insulating member 42 as viewed in the stacking direction. The diameter of the positioning holes 52a is larger than the diameter of the positioning holes 44. The first bipolar plate 46 includes a plurality of circular protrusions 53, e.g. at four positions (the number of the positions is not limited). The protrusions 53 contact the welding portions 45 of the frame shaped insulating member 42, respectively (see FIG. 3) as viewed in the stacking direction.

As shown in FIG. 2, the outer end of a surface 46b of the first bipolar plate 46 is joined to the outer end of a surface 48b of the second bipolar plate 48 by welding, brazing, etc. in a liquid tight manner. A coolant flow field 54 is formed between the surface 46b of the first bipolar plate 46 and the surface 48b of the second bipolar plate 48. The coolant flow field 54 is connected to the coolant supply passage 32a and the coolant discharge passage 32b, and includes a plurality of coolant flow grooves extending in the direction indicated by the arrow B.

The second bipolar plate 48 has an oxygen-containing gas flow field 56 on its surface 48a facing the cathode 40 of the membrane electrode assembly 26a. The oxygen-containing gas flow field 56 is connected to the oxygen-containing gas supply passage 30a and the oxygen-containing gas discharge passage 30b. The oxygen-containing gas flow field 56 includes a plurality of flow grooves extending in the direction indicated by the arrow B.

Figure 5:
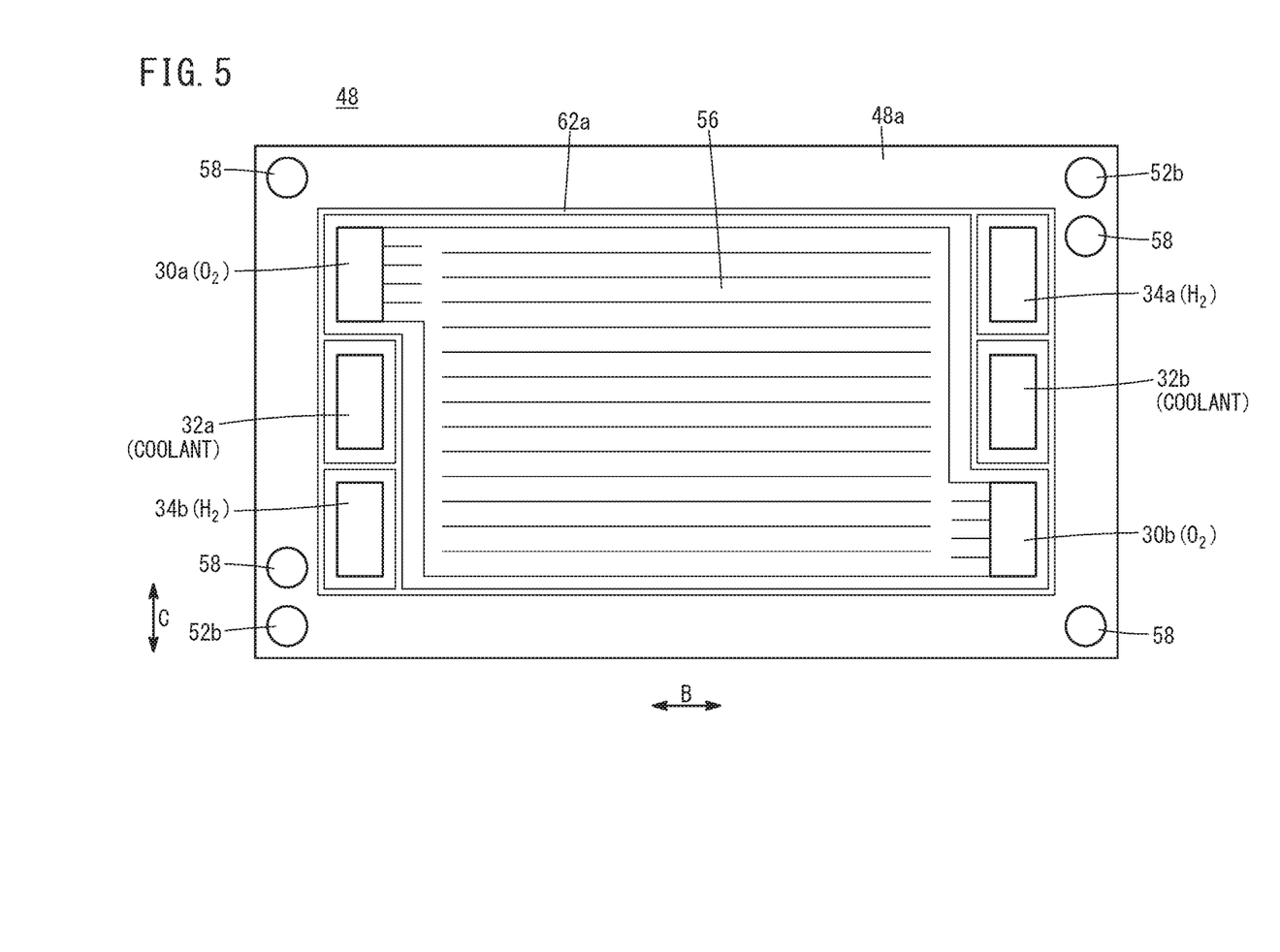
FIG. 5 is a front view showing a second bipolar plate of the fuel cell.

As shown in FIG. 5, circular positioning holes 52b are formed at one pair of diagonal positions (adjacent to the fuel gas supply passage 34a and the fuel gas discharge passage 34b) of the second bipolar plate 48. The positioning holes 52b are provided coaxially with the positioning holes 52a of the first bipolar plate 46 as viewed in the stacking direction. The diameter of the positioning holes 52b is the same as the diameter of the positioning holes 52a. Holes 58 are formed in the second bipolar plate 48 at positions in alignment with the respective protrusions 53 of the first bipolar plate 46 as viewed in the stacking direction.

A first seal member 60 is formed integrally with the surfaces 46a, 46b of the first bipolar plate 46, around the outer end of the first bipolar plate 46. Alternatively, a member separate from the first bipolar plate 46 may be provided as the first seal member 60 provided on the surfaces 46a, 46b of the first bipolar plate 46. A second seal member 62 is formed integrally with at least the surface 48a of the second bipolar plate 48, around the outer end of the second bipolar plate 48. Alternatively, a member separate from the second bipolar plate 48 may be provided as the second seal member 62 provided at least on the surface 48a of the second bipolar plate 48.

Each of the first seal member 60 and the second seal member 62 is made of seal material, cushion material, or packing material such as an EPDM rubber (ethylene propylene diene monomer rubber), an MDR (nitrile butadiene rubber), a fluoro rubber, a silicone rubber, a fluorosilicone rubber, a butyl rubber, a natural rubber, a styrene rubber, a chloroprene rubber, or an acrylic rubber.

As shown in FIG. 4, the first seal member 60 includes a fuel gas (reactant gas) seal line 60a on a surface 46a of the first bipolar plate 46, for preventing leakage of the fuel gas (reactant gas). As shown in FIG. 2, the first seal member 60 includes a coolant seal line 60b on a surface 46b of the first bipolar plate 46, for preventing leakage of the coolant.

As shown in FIGS. 2 and 5, the second seal member 62 includes an oxygen-containing gas (reactant gas) seal line 62a on a surface 48a of the second bipolar plate 48, for preventing leakage of the oxygen-containing gas (reactant gas). The protrusions 53 and the holes 58 are provided outside the fuel gas seal line 60a, the coolant seal line 60b, and the oxygen-containing gas seal line 62a. The positioning holes 44, 52a, 52b are provided outside the fuel gas seal line 60a, the coolant seal line 60b, and the oxygen-containing gas seal line 62a.

Figure 6:
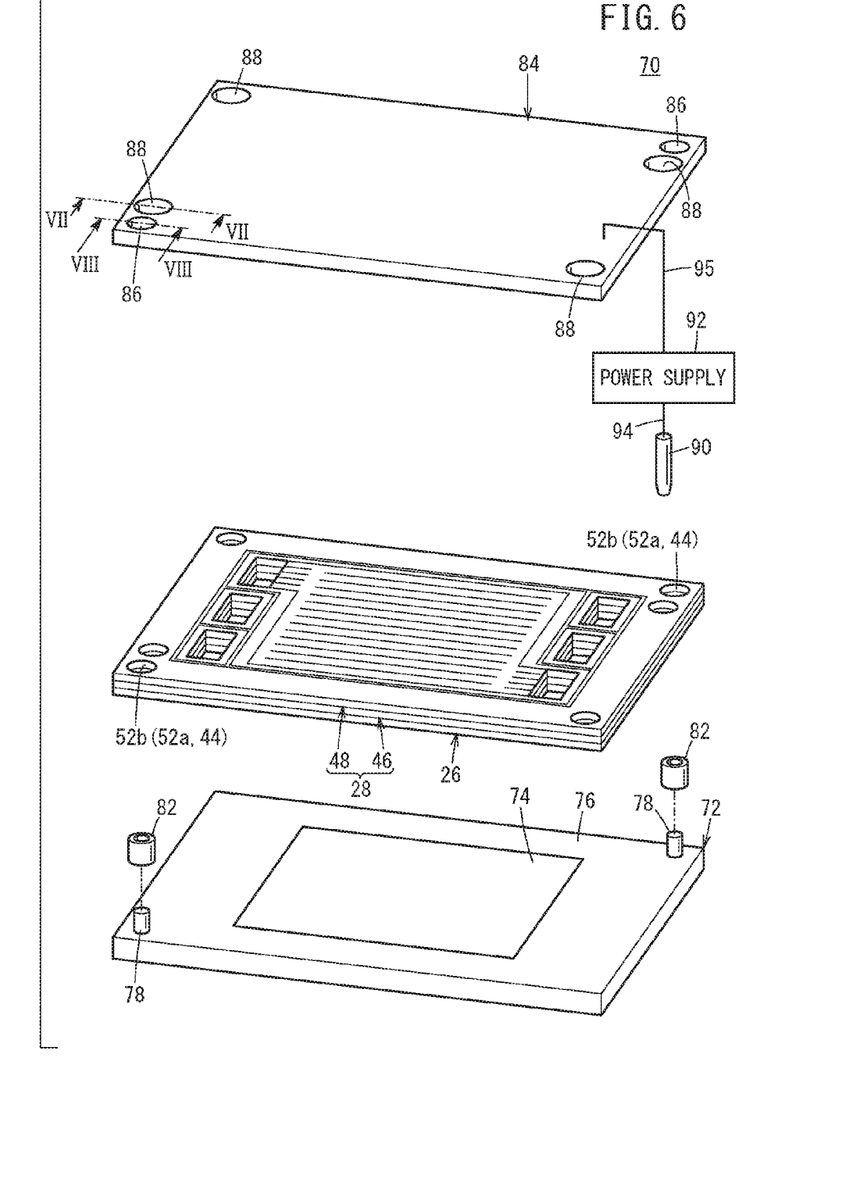
FIG. 6 is an exploded perspective view showing main components of a production apparatus according to a first embodiment of the present invention.

FIG. 6 is an exploded perspective view showing main components of a production apparatus 70 according to a first embodiment of the present invention, for producing the fuel cell 10.

Figure 7:
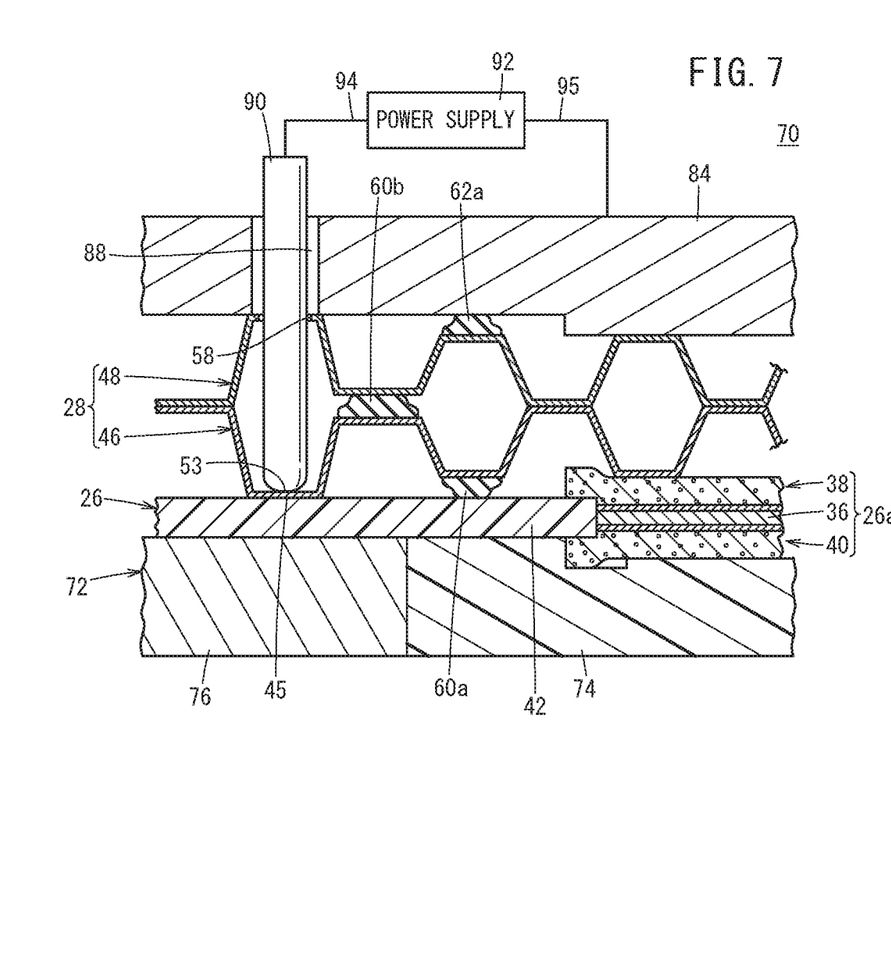
FIG. 7 is a cross sectional view showing the production apparatus, taken along a line VII-VII in FIG. 6.

The production apparatus 70 includes a pedestal section (lower jig) 72. The frame equipped membrane electrode assembly 26 is placed on the pedestal section 72, and the metal separator 28 is placed on the frame equipped membrane electrode assembly 26. As shown in FIGS. 6 and 7, the pedestal section 72 includes an insulating pedestal 74 and a metal pedestal 76. At least the membrane electrode assembly 26a is placed on the insulating pedestal 74. The welding portions 45 of the frame shaped insulating member 42 are placed on the metal pedestal 76. The insulating pedestal 74 can be made of any of various insulating resins. Preferably, the outer end of the insulating pedestal 74 is placed outside the fuel gas seal line 60a and the oxygen-containing gas seal line $2a, and inside the welding portions 45 (see FIG. 7).

Figure 8:
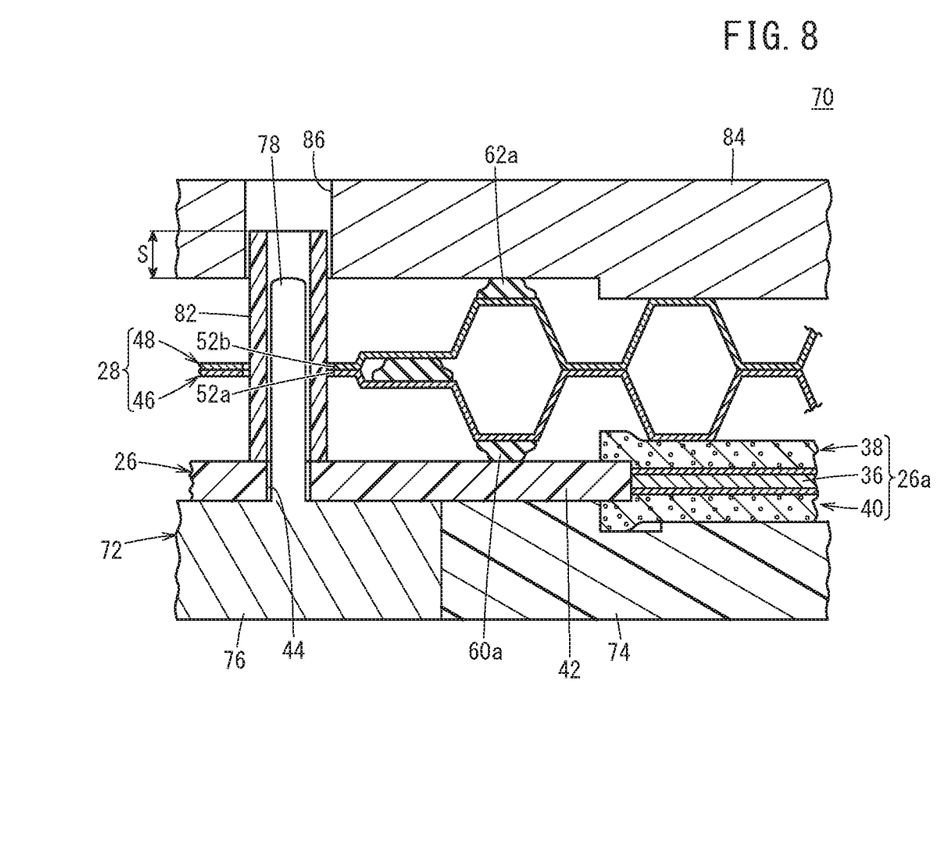
FIG. 8 is a cross sectional view showing the production apparatus, taken along a line VIII-VIII in FIG. 6.

Positioning pins 78 are formed integrally with the metal pedestal 76 at one pair of diagonal positions. The positioning pins 78 are inserted into the positioning holes 44, 52a, 52b. As shown in FIG. 8, the opening diameter of the positioning hole 44 is the same as the diameter of the positioning pin 78, and the opening diameter of the positioning holes 52a, 52b are larger than the diameter of the positioning pin 78. A collar member 82 made of insulating resin is externally fitted around the positioning pin 78, between outer circumference of the positioning pin 78 and inner circumference of the positioning holes 52a, 52b. The axial length of the collar member 82 is larger than the thickness of the metal separator 28.

As shown in FIG. 6, the production apparatus 70 includes an upper jig 84 placed on the metal separator 28. The outer size of the upper jig 84 is the same as the outer size of the metal separator 28, and the upper jig 84 is made of electrically conductive metal. Positioning holes 86 are formed in the upper jig 84. The positioning holes 86 are coaxial with the positioning holes 52a, 52b, and the opening diameter of the positioning holes 86 is the same as the opening diameter of the positioning holes 52a, 52b, A plurality of holes 88 are formed in the upper jig 84. The holes 88 are coaxial with the holes 58 of the second bipolar plate 48. Preferably, the opening diameter of the holes 88 is larger than the opening diameter of the holes 58.

An electrode member 90 for performing resistance welding (hereinafter referred to as the resistance welding electrode member 90, or simply referred to as the electrode member 90) contacts the protrusion 53 of the first bipolar plate 46 stacked on the welding portion 45 of the frame shaped insulating member 42, from a recessed side of the protrusion 53. The electrode member 90 is connected to the upper jig 84. One of the terminals of a power supply 92 is electrically connected to the electrode member 90 through a lead wire 94, and the other of the terminals of the power supply 92 is electrically connected to the upper jig 84 through a lead wire 95. The electrode member 90 has a cylindrical shape, and the diameter of the electrode member 90 is smaller than the opening diameter of the hole 58.

Next, operation of producing the fuel cell 10 using the production apparatus 70 will be described below.

Firstly, the outer end of the first bipolar plate 46 and the outer end of the second bipolar plate 48 are joined together integrally (e.g., by welding or brazing) to form the metal separator 28. In the meanwhile, on the part of the frame equipped membrane electrode assembly 26, for example, in a state where the solid polymer electrolyte membrane 36 is joined to the anode 38, the anode 38 and the cathode 40 are adhered to the frame shaped insulating member 42. The frame shaped insulating member 42 is sandwiched by the anode 38 and the cathode 40. It should be noted that the solid polymer electrolyte membrane 36 may be joined to the cathode 40 beforehand. Alternatively, the solid polymer electrolyte membrane 36 may be fixed to the frame shaped insulating member 42. In this manner, the frame equipped membrane electrode assembly 26 is fabricated.

Next, as shown in FIGS. 6 through 8, the frame equipped membrane electrode assembly 26 is placed on the pedestal section 72 of the production apparatus 70, and the metal separator 28 is placed on the frame equipped membrane electrode assembly 26. At this time, as shown in FIG. 8, the positioning pins 78 of the metal pedestal 76 are fitted to the positioning holes 44 provided in the frame shaped insulating member 42 of the frame equipped membrane electrode assembly 26, for positioning the frame equipped membrane electrode assembly 26.

Further, after the collar members 82 are externally fitted to the positioning pins 78, the collar members 82 are inserted into both of the positioning holes 52a of the first bipolar plate 46 and the positioning holes 52b of the second bipolar plate 48. Therefore, the metal separator 28 is positioned on the frame equipped membrane electrode assembly 26 through the positioning pins 78 and the collar members 82.

Further, the upper jig 84 is placed on the metal separator 28. As shown in FIG. 8, an upper portion of each of the collar members 82 is inserted to the positioning hole 86 over the length S. Thus, the upper jig 84 is positioned relative to the pedestal section 72. As shown in FIG. 7, the electrode member 90 having a spherical front end passes through the hole 58 of the second bipolar plate 48, and contacts the protrusion 53 of the first bipolar plate 46, from the recessed side of the protrusion 53.

In this state, when the power supply 92 is turned on, energy is concentrated at the protrusion 53 of the first bipolar plate 46, and the protrusion 53 is heated. Thus, the welding portion 45 of the frame shaped insulating member 42 is melted, and adhered to the protrusion 53. That is, the protrusion 53 of the first bipolar plate 46 and the welding portion 45 of the frame shaped insulating member 42 are joined together by resistance welding, e.g., by micro spot welding.

In the first embodiment, welding portion 45 is provided in the frame shaped insulating member 42 connected to the outer portion of the membrane electrode assembly 26a. The frame shaped insulating member 42 includes the welding portions 45 welded to the first bipolar plate 46 by resistance welding. In the structure, the cooling process as in the case of welding (joining) by high frequency heating becomes unnecessary, and the time period required for welding is reduced effectively. Moreover, no dedicated member is required for the welding portion 45, and the structure can be simplified advantageously.

Specifically, in the first embodiment, as shown in FIG. 7, the first bipolar plate 46 has the protrusions 53 which contact the welding portions 45 of the frame shaped insulating member 42. The second bipolar plate 48 has the holes 58 in alignment with the protrusions 53 as viewed in the direction in which the first bipolar plate 46 and the second bipolar plate 48 are stacked together. This structure is advantageous in that it becomes possible to perform the assembling operation of the fuel cells 10 efficiently and suitably at low cost.

Further, as shown in FIG. 3, the metal separator 28 has the fuel gas seal line 60a, the oxygen-containing gas seal line 62a, and the coolant seal line 60b. The protrusions 53 and the holes 58 are provided outside the fuel gas seal line 60a, the oxygen-containing gas seal line 62a, and the coolant seal line 60b. In the structure, it is possible to prevent entry of dust, etc. which tends to be produced at the time of resistance welding, into the fuel gas flow field 50, the oxygen-containing gas flow field 56, or the coolant flow field 54 as much as possible.

Further, as shown in FIG. 7, the end of the insulating pedestal 74 extends outside the fuel gas seal line 60a and the oxygen-containing gas seal line 62a, and is provided inside the welding portions 45. The welding portions 45 are placed on the metal pedestal 76. Thus, it becomes possible to suitably protect the membrane electrode assembly 26a without causing flow of the electrical current through the membrane electrode assembly 26a. Further, by using the metal pedestal 76, since heat is conducted easily at the time of welding, improvement in the cooling performance is achieved, and improvement in the efficiency of operation is achieved easily to a greater extent.

Next, operation of the fuel cells 10 having the structure as described above will be described below.

As shown in FIG. 1, at the end plate 18a, an oxygen-containing gas is supplied to the oxygen-containing gas supply passage 30a, and a fuel gas such as a hydrogen-containing gas is supplied to the fuel gas supply passage 34a. Further, a coolant such as pure water, ethylene glycol, or oil, etc. is supplied to the coolant supply passage 32a.

As shown in FIG. 2, the oxygen-containing gas flows from the oxygen-containing gas supply passage 30a into the oxygen-containing gas flow field 56 of the second bipolar plate 48. Thus, the oxygen-containing gas flows along the oxygen-containing gas flow field 56 in the direction indicated by the arrow B, and the oxygen-containing gas is supplied to the cathode 40 of the membrane electrode assembly 26a.

In the meanwhile, the fuel gas flows from the fuel gas supply passage 34a into the fuel gas flow field 50 of the first bipolar plate 46. The fuel gas flows along the fuel gas flow field 50 in the direction indicated by the arrow B, and the fuel gas is supplied to the anode 38 of the membrane electrode assembly 26a.

Thus, in the membrane electrode assembly 26a, as shown in FIG. 3, the fuel gas supplied to the anode 38 and the oxygen-containing gas supplied to the cathode 40 are partially consumed in electrochemical reactions in the first electrode catalyst layer 38a and the second electrode catalyst layer 40a for generating electrical energy in the fuel cells 10.

Then, as shown in FIG. 2, the oxygen-containing gas partially consumed at the cathode 40 is discharged into the oxygen-containing gas discharge passage 30b. Likewise, the fuel gas partially consumed at the anode 38 is discharged into the fuel gas discharge passage 34b.

In the meanwhile, the coolant supplied to the coolant supply passage 32a flows into the coolant flow field 54 formed between the first bipolar plate 46 and the second bipolar plate 48 which are joined together. In this coolant flow field 54, the coolant flows in the horizontal direction indicated by the arrow B to cool the entire power generation surface of the membrane electrode assembly 26a. Then, the coolant is discharged into the coolant discharge passage 32b.

Figure 9:
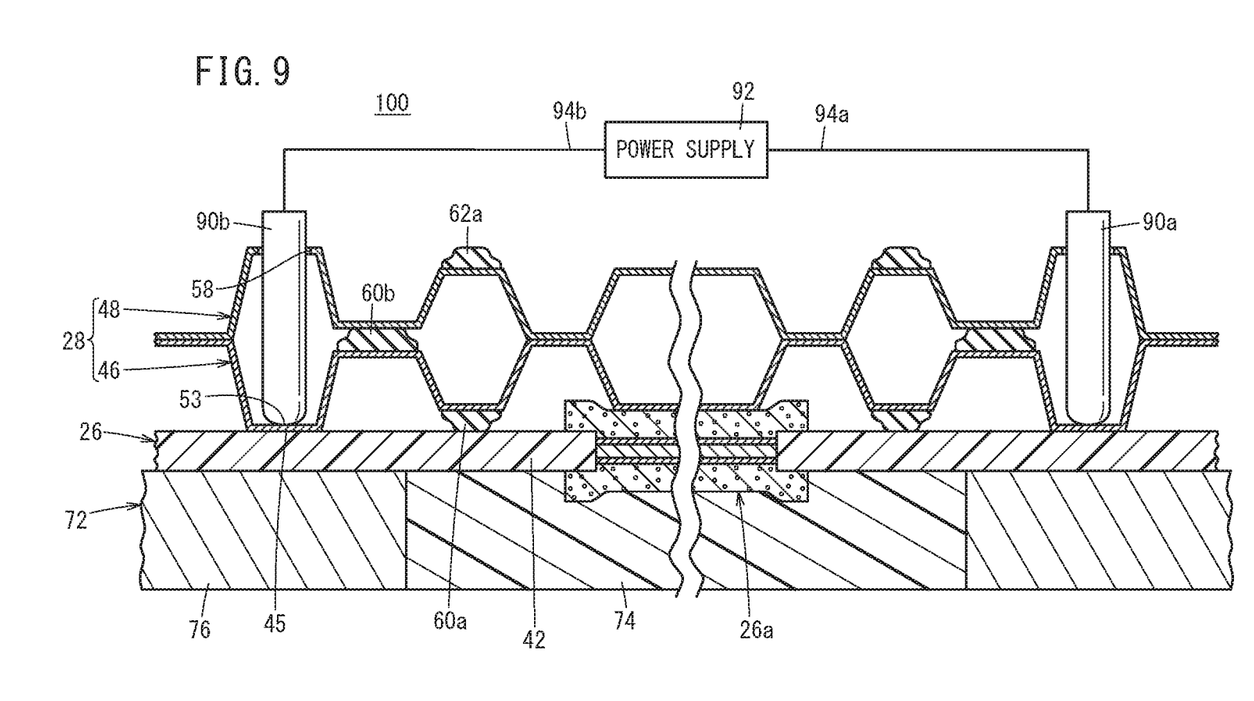
FIG. 9 is a cross sectional view showing main components of a production apparatus according to a second embodiment of the present invention.

FIG. 9 is a cross sectional view showing main components of a production apparatus 100 according to a second embodiment of the present invention, for producing the fuel cell 10. The constituent elements of the production apparatus 100 that are identical to those of the production apparatus 70 according to the first embodiment are labeled with the same reference numerals and detailed description thereof will be omitted.

The production apparatus 100 is a series spot welding apparatus. For example, the production apparatus 100 includes a pair of electrode members 90a, 90b. The electrode member 90a is electrically connected to one of the terminals of the power supply 92 through a lead wire 94a, and the electrode member 90b is electrically connected to the other of the terminals of the power supply 92 through a lead wire 94b. A metal pedestal 76 of a pedestal section 72 functions as a backup electrode.

In the second embodiment having the structure as described above, the pair of electrode members 90a, 90b passes through the holes 58 of the second bipolar plate 48, and contact the protrusions 53 of the first bipolar plate 46, from recessed sides of the protrusions 53. Thus, the protrusions 53 are heated, and the welding portions 45 of the frame shaped insulating member 42 are melted, and adhered to the protrusions 53. Accordingly, the welding process can be applied to the welding portions 45 at the two positions at the same time, and further improvement in the work efficiency is achieved advantageously.

Although the pair of electrode members 90a, 90b is provided in the second embodiment, the present invention is not limited in this respect. Alternatively, three or more electrode members may be used.

Figure 10:
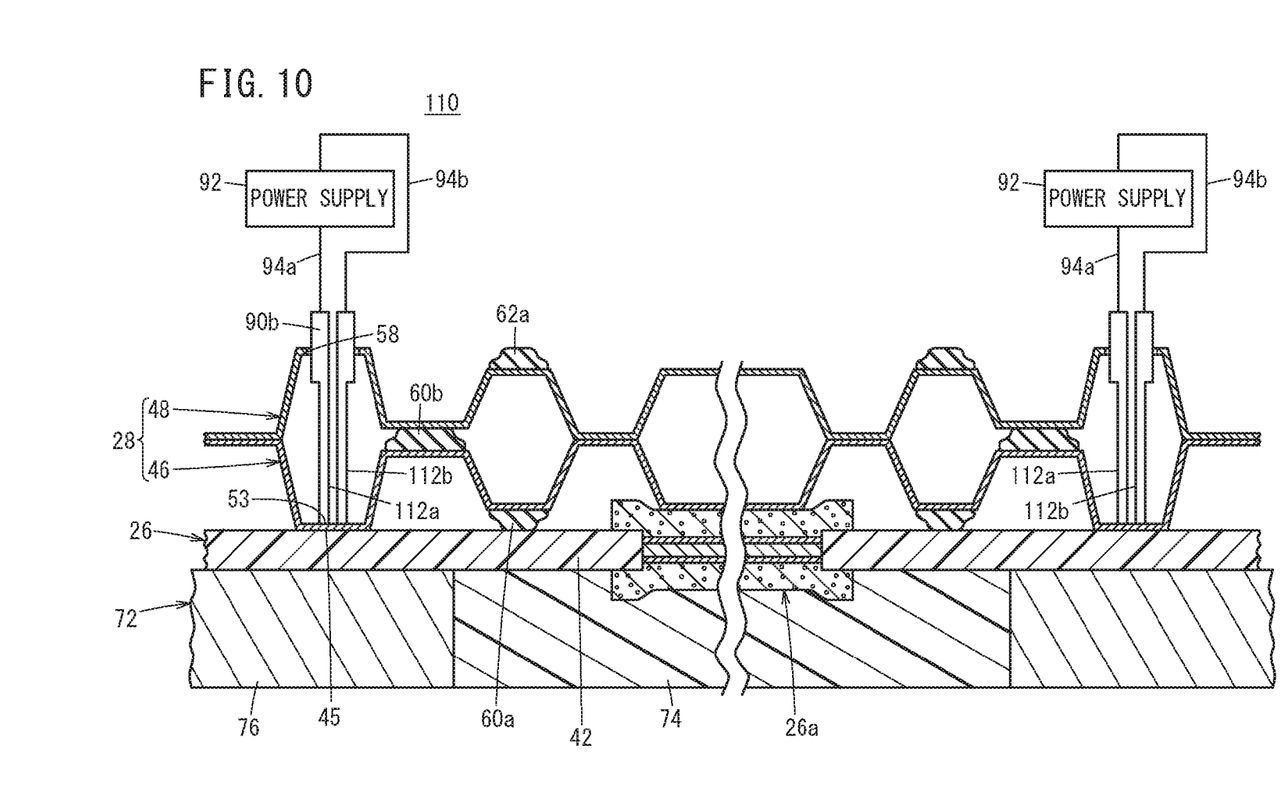
FIG. 10 is a cross sectional view showing main components of a production apparatus according to a third embodiment of the present invention.

FIG. 10 is a cross sectional view showing main components of a production apparatus 110 according to a third embodiment of the present invention, for producing the fuel cell 10. The constituent elements of the production apparatus 100 that are identical to those of the production apparatus 70 according to the first embodiment are labeled with the same reference numerals, and detailed description thereof is omitted.

The production apparatus 110 is a series spot welding apparatus, and as resistance welding electrode members, the production apparatus 110 includes a pair of electrode members 112a, 112b, for example. The electrode member 112a is electrically connected to one of terminals of a power supply 92 through a lead wire 94a, and the electrode member 112b is electrically connected to the other of the terminals of the power supply 92 through a lead wire 94b.

Figure 11:
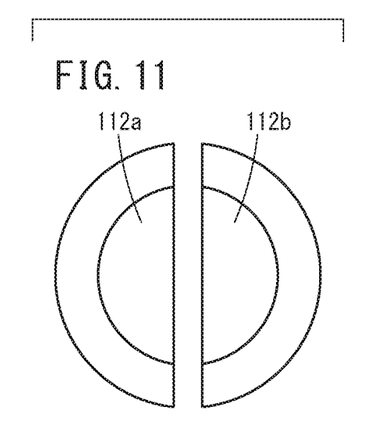
FIG. 11 is a view showing an electrode member for resistance welding (resistance welding electrode member) of the production apparatus.

As shown in FIG. 11, each of the electrode members 112a, 112b has a semicircular shape in cross section. The electrode members 112a, 112b are provided adjacent to each other to form a circular shape as a whole. Though not shown, when the electrode members 112a, 112b are provided, the electrode members 112a, 112b are insulated from each other.

In the third embodiment having the structure described above, the pair of electrode members 112a, 112b are provided adjacent to each other, and in this state, the electrode members 112a, 112b pass through the same hole 58 of the second bipolar plate 48, and contact the protrusion 53 of the first bipolar plate 46 from a recessed side of the protrusion 53. Therefore, the protrusion 53 is heated by the pair of electrode members 112a, 112b. The welding portion 45 of the frame shaped insulating member 42 is melted, and adhered to the protrusion 53.

As in the case of the above protrusion 53, in each of the other protrusions 53, the welding portion 45 is joined by the pair of electrode members 112a, 112b. In the structure, it is possible to apply the welding process to the welding portions 45 at the four positions at the same time, and improvement in the work efficiency is achieved advantageously.

In the first to third embodiments, the holes 58 are provided in the second bipolar plate 48. However, the present invention is not limited in this respect. For example, cutout portions like recesses may be provided instead of the holes 58. Further, the outer size of the second bipolar plate 48 may be smaller than the outer size of the first bipolar plate 46, and the protrusion 53 may be provided outside the second bipolar plate 48. That is, the second bipolar plate 48 does not require any machining operation for making holes, cutouts, etc.

While the invention has been particularly shown and described with a reference to preferred embodiments, it will be understood that variations and modifications can be effected thereto by those skilled in the art without departing from the scope of the invention as defined by the appended claims.

What is claimed is:

1. A fuel cell comprising:
a frame equipped membrane electrode assembly including a membrane electrode assembly and a frame shaped insulating member connected to the membrane electrode assembly, the membrane electrode assembly including an electrolyte membrane and electrodes on both sides of the electrolyte membrane, the frame shaped insulating member being provided around the membrane electrode assembly;
a first metal separator disposed on a first side of the membrane electrode assembly and a second metal separator disposed on a second side of the membrane electrode assembly,
wherein:
the first metal separator includes a first bipolar plate disposed on the first side of the membrane electrode assembly and a second bipolar plate which is also disposed on the first side of the membrane electrode assembly, portions of the first and second bipolar plates being in abutting contact with one another and joined together;
the second metal separator includes a third bipolar plate disposed on the second side of the membrane electrode assembly and a fourth bipolar plate which is also disposed on the second side of the membrane electrode assembly, portions of the third and fourth bipolar plates being in abutting contact with one another and joined together;
the frame shaped insulating member includes a welding portion welded to the first bipolar plate by resistance welding;
wherein the first bipolar plate includes a protrusion which contacts the welding portion of the frame shaped insulating member; and
the second bipolar plate includes a hole at a position in alignment with the protrusion and with the welding portion as viewed in a direction in which the first bipolar plate and the second bipolar plate are stacked together.

2. The fuel cell according to claim 1, wherein the metal separator includes a reactant gas seal line configured to prevent leakage of a reactant gas, and a coolant seal line configured to prevent leakage of a coolant; and the protrusion and the hole are provided outside the reactant gas seal line and the coolant seal line.

3. The fuel cell according to claim 1, wherein the first and second bipolar plates are joined by welding or brazing.

4. The fuel cell according to claim 1, wherein the hole in the second bipolar plate is configured to receive an electrode member therein.

5. The fuel cell according to claim 1, wherein the hole in the second bipolar plate is out of contact with, and spaced away from the protrusion of the first bipolar plate.

* * * * *